United States Patent
Tamasi et al.

(10) Patent No.: US 11,683,253 B2
(45) Date of Patent: *Jun. 20, 2023

(54) NETWORK ADAPTIVE LATENCY REDUCTION THROUGH FRAME RATE CONTROL

(71) Applicant: NVIDIA Corporation, Santa Clara, CA (US)

(72) Inventors: Tony Tamasi, Los Gatos, CA (US); Xun Wang, San Jose, CA (US); Franck Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/222,631

(22) Filed: Apr. 5, 2021

(65) Prior Publication Data

US 2021/0226877 A1 Jul. 22, 2021

Related U.S. Application Data

(63) Continuation of application No. 16/797,942, filed on Feb. 21, 2020, now Pat. No. 11,012,338, and a
(Continued)

(51) Int. Cl.
*H04L 12/26* (2006.01)
*H04L 29/06* (2006.01)
(Continued)

(52) U.S. Cl.
CPC ...... *H04L 43/0876* (2013.01); *H04L 43/0858* (2013.01); *H04L 65/762* (2022.05); *H04L 65/80* (2013.01)

(58) Field of Classification Search
CPC ............... H04L 65/762; H04L 43/0858; H04L 43/0876; H04L 65/80
See application file for complete search history.

(56) References Cited

U.S. PATENT DOCUMENTS 5,995,518 A 11/1999 Burns et al.
6,182,125 B1 1/2001 Borella et al.
(Continued)

FOREIGN PATENT DOCUMENTS

CN 1625848 A 6/2005
CN 101467183 A 6/2009
(Continued)

OTHER PUBLICATIONS

Sudhakaran, S., "The Difference Between encoding, Transcoding and Rendering", Wolfcrow, Retrived from Internet URL : http://wolfcrow.com/blog/the-difference-between-encoding-transcoding-and-rendering/_, accessed on Sep. 30, 2016, p. 6 (2013).
(Continued)

*Primary Examiner* — Abdullahi E Salad
(74) *Attorney, Agent, or Firm* — Taylor English Duma L.L.P.

(57) ABSTRACT

Novel solutions are provided for consistent Quality of Service in cloud gaming system that adaptively and dynamically compensate for poor network conditions by moderating rendered frame rates using frame rate capping to optimize for network latency savings (or surplus). In further embodiments, the encoding/sent frame rate to the client can also be managed in addition, or as an alternative to capping the rendered frame rates. The claimed embodiments not only maintain a constant Quality of Service (QoS) for the user, but may also be employed to leverage higher-performing networks to reduce operational costs.

19 Claims, 5 Drawing Sheets

Related U.S. Application Data continuation of application No. 16/797,948, filed on Feb. 21, 2020, now Pat. No. 10,999,174, said application No. 16/797,942 is a continuation of application No. 13/728,927, filed on Dec. 27, 2012, now Pat. No. 10,616,086, said application No. 16/797,948 is a continuation of application No. 13/728,927, filed on Dec. 27, 2012, now Pat. No. 10,616,086.

(51) Int. Cl.
| | |
|---|---|
| *H04L 43/0876* | (2022.01) |
| *H04L 43/0852* | (2022.01) |
| *H04L 65/80* | (2022.01) |
| *H04L 65/75* | (2022.01) |

(56) References Cited

U.S. PATENT DOCUMENTS

| | | | |
|---|---|---|---|
| 6,665,751 | B1 | 12/2003 | Chen et al. |
| 7,016,407 | B2 | 3/2006 | Kaye et al. |
| 7,516,255 | B1 | 4/2009 | Hobbs |
| 8,366,552 | B2 | 2/2013 | Perlman et al. |
| 8,446,452 | B2 | 5/2013 | Hosseini et al. |
| 8,675,577 | B2 | 3/2014 | Oyman et al. |
| 8,918,533 | B2 | 12/2014 | Chen et al. |
| 9,619,916 | B2 | 4/2017 | Steinke |
| 10,320,951 | B2 | 6/2019 | Leber |
| 10,523,726 | B2 | 12/2019 | Pantos et al. |
| 2002/0172153 | A1 | 11/2002 | Vernon |
| 2003/0223497 | A1 | 12/2003 | Suzuki et al. |
| 2004/0057381 | A1 | 3/2004 | Tseng et al. |
| 2004/0131067 | A1 | 7/2004 | Cheng et al. |
| 2004/0148423 | A1 | 7/2004 | Key et al. |
| 2005/0033856 | A1 | 2/2005 | Li |
| 2005/0036546 | A1 | 2/2005 | Rey et al. |
| 2005/0084232 | A1 | 4/2005 | Herberger et al. |
| 2005/0132264 | A1 | 6/2005 | Joshi et al. |
| 2005/0232151 | A1 | 10/2005 | Chapweske et al. |
| 2006/0077902 | A1 | 4/2006 | Kannan et al. |
| 2006/0165166 | A1 | 7/2006 | Chou et al. |
| 2006/0184697 | A1 | 8/2006 | Virdi et al. |
| 2006/0230171 | A1 | 10/2006 | Dacosta |
| 2007/0024705 | A1 | 2/2007 | Richter et al. |
| 2007/0067480 | A1 | 3/2007 | Beek et al. |
| 2007/0180106 | A1 | 8/2007 | Pirzada et al. |
| 2007/0183493 | A1 | 8/2007 | Kimpe |
| 2007/0201388 | A1 | 8/2007 | Shah et al. |
| 2007/0294173 | A1 | 12/2007 | Levy et al. |
| 2008/0043643 | A1 | 2/2008 | Thielman et al. |
| 2008/0052414 | A1 | 2/2008 | Panigrahi et al. |
| 2008/0055311 | A1 | 3/2008 | Aleksic et al. |
| 2008/0084900 | A1 | 4/2008 | Dunn |
| 2008/0101466 | A1 | 5/2008 | Swenson et al. |
| 2008/0165280 | A1 | 7/2008 | Deever et al. |
| 2008/0267069 | A1 | 10/2008 | Thielman et al. |
| 2009/0207172 | A1 | 8/2009 | Inoue et al. |
| 2009/0222873 | A1 | 9/2009 | Einarsson |
| 2009/0252227 | A1* | 10/2009 | NepomucenoLeung ............... H04N 19/507 375/E7.279 |
| 2010/0036963 | A1 | 2/2010 | Gahm et al. |
| 2010/0063992 | A1 | 3/2010 | Ma et al. |
| 2010/0201878 | A1* | 8/2010 | Barenbrug ......... H04N 21/4316 348/563 |
| 2011/0058554 | A1 | 3/2011 | Jain et al. |
| 2011/0255841 | A1 | 10/2011 | Remennik et al. |
| 2011/0263332 | A1* | 10/2011 | Mizrachi ............... A63F 13/12 463/42 |
| 2011/0276710 | A1* | 11/2011 | Mighani .......... H04N 21/44227 709/231 |
| 2012/0004040 | A1 | 1/2012 | Pereira et al. |
| 2012/0005365 | A1* | 1/2012 | Ma ......................... H04L 65/70 709/231 |
| 2012/0250762 | A1 | 10/2012 | Kaye et al. |
| 2012/0254456 | A1 | 10/2012 | Visharam et al. |
| 2012/0265892 | A1* | 10/2012 | Ma ................... H04N 21/23418 709/231 |
| 2012/0281552 | A1 | 11/2012 | Niu et al. |
| 2012/0281562 | A1 | 11/2012 | Holmer |
| 2012/0311043 | A1 | 12/2012 | Chen et al. |
| 2013/0097309 | A1* | 4/2013 | Ma ......................... H04L 67/02 709/224 |
| 2013/0107930 | A1 | 5/2013 | Le Faucheur et al. |
| 2013/0120651 | A1 | 5/2013 | Perry |
| 2013/0159393 | A1 | 6/2013 | Imai et al. |
| 2013/0254330 | A1 | 9/2013 | Maylander et al. |
| 2013/0300633 | A1 | 11/2013 | Horio et al. |
| 2013/0307847 | A1* | 11/2013 | Dey ........................ G06T 1/00 345/419 |
| 2014/0122562 | A1 | 5/2014 | Turner et al. |
| 2015/0019670 | A1 | 1/2015 | Redmann |
| 2015/0026309 | A1* | 1/2015 | Radcliffe ............. H04L 65/612 709/219 |
| 2015/0207837 | A1 | 7/2015 | Guerrera et al. |
| 2015/0207873 | A1* | 7/2015 | Chang ................. H04L 67/1048 709/205 |
| 2015/0215359 | A1 | 7/2015 | Bao et al. |
| 2015/0340009 | A1 | 11/2015 | Loeffler et al. |
| 2018/0270284 | A1* | 9/2018 | Lee ......................... H04L 45/12 |
| 2019/0308099 | A1* | 10/2019 | Lalonde ............... A63F 13/352 |
| 2019/0321725 | A1* | 10/2019 | Zimring ............... A63F 13/335 |

FOREIGN PATENT DOCUMENTS

| | | |
|---|---|---|
| CN | 102571900 A | 7/2012 |
| EP | 2 073 552 A1 | 6/2009 |
| TW | 201041401 A | 11/2010 |
| TW | 201202975 A | 1/2012 |
| TW | 201223256 A | 6/2012 |
| TW | 201230850 A | 7/2012 |
| WO | 2012/078640 A2 | 6/2012 |

OTHER PUBLICATIONS

Notice of Allowance dated Apr. 20, 2021 in U.S. Appl. No. 16/797,942, 2 pages.

Tamasi, Tony; Decision on Rejection for Chinese Patent Application No. 201910744935.3, filed Aug. 13, 2019, dated Jan. 20, 2023, 8 pgs.

Tamasi, Tony; Office Action for Chinese patent application No. 201910744935.3, filed Dec. 27, 2013, dated Aug. 11, 2022, 17 pgs.

* cited by examiner

Exemplary Computer
System 500

NETWORK ADAPTIVE LATENCY REDUCTION THROUGH FRAME RATE CONTROL

CROSS REFERENCE TO RELATED APPLICATIONS

This application is a continuation of U.S. Non-Provisional application Ser. No. 16/797,948, entitled "NETWORK ADAPTIVE LATENCY REDUCTION THROUGH FRAME RATE CONTROL" filed Feb. 21, 2020 and U.S. Non-Provisional application Ser. No. 16/797,942 entitled "NETWORK ADAPTIVE LATENCY REDUCTION THROUGH FRAME RATE CONTROL" filed Feb. 21, 2020, both of which are continuations of U.S. Non-Provisional application Ser. No. 13/728,927 entitled "NETWORK ADAPTIVE LATENCY REDUCTION THROUGH FRAME RATE CONTROL" filed Dec. 27, 2012. Each of these applications is incorporated herein by reference in its entirety.

BACKGROUND

Cloud computing provides processing, capacity, and storage on demand. Typical cloud computing service allow a user to access and requisition a virtually unlimited amount of computing resources on demand from a pool of shared computing resources. Often, these resources may consist of virtualized instances of actual computer hardware systems (e.g., servers).

Cloud computing providers may include many different types of cloud services. An area of increasing popularity in cloud computing is cloud gaming. Cloud gaming, also called gaming on-demand, is a type of online gaming that allows direct and on-demand streaming of games onto a computer or other electronic device, typically through a network, such as the Internet. Conventionally, a video game provided by a cloud gaming operator stores the software of the video game on one or more servers. When a user accesses the servers—typically through a network connection—the software is executed and the resultant graphical output is streamed to the user's computer or display device.

Generally, the actual rendering and processing of the images constituting the graphical content displayed to the user is also performed in the servers, before being encoded (compressed) and then transmitted (streamed) to the user's device, where the encoded video stream is subsequently decoded and displayed. User control input—typically responsive to the progression of images displayed—may be received from the user and directly transmitted back to the server, whereupon the input is recorded, and a new set of images may be processed, rendered, encoded, and then streamed back to the user or "client" device. This process may be performed continuously for each user, and often for substantially the entirety of the time the video game is being played by the user.

Cloud gaming allows users to access games without the need for a dedicated gaming console or gaming system, and largely eliminates higher hardware requirements for the computer systems of users, by abstracting the majority of the memory and processing needs from the user's device and on to the server. Moreover, the time required to download and install the video game on the user's local device is eliminated, since the software is already pre-loaded on the servers of the game's operator.

Unfortunately, a new host of challenges are also introduced by cloud gaming over traditional, localized gaming solutions. For example, additional steps are required to prepare the graphical output for display, such as compressing the video continuously in real time, decompressing the video at the user's client device, and continuously streaming data through a network connection. The challenge to perform these steps quickly and efficiently enough to not noticeably impact the user's experience while accommodating limitations due to the network infrastructure is considerable.

One quantifiable measure of this efficiency is the latency experienced by the user. Latency is a measure of the responsiveness of the user's input to the server and back, and can be influenced by a host of variables, including how fast the server is running, the efficiency of the software and hardware running on the server, the network infrastructure, and the distance that the network has to travel to the user's device on the client side. The further that the user's device is from the server for example, either in distance or network hops or network quality, the more latency that could be introduced due to lengthier transmission or routing times. Long latencies, often referred to as "lag" by video game players, are undesirable, particularly during competitive games and/or time-sensitive interactions in games, and can have a significant negative effect on user experience.

Unfortunately, many traditional cloud gaming systems do not account for network attributed latency at all, considering them to be unavoidable or inevitable. At best, cloud gaming operators may attempt to manage latencies by provisioning additional resources at the server side to expedite processing. However, this can increase capital expenditure costs for the game's operators, potentially prohibitively, and is neither an efficient nor effective solution. Still other cloud gaming operators may attempt to avoid latencies altogether by limiting the applications offered, either by limiting the complexity of the images being rendered and the size and/or frequency of the data transmissions or providing only games with asynchronous and/or mechanisms unrelated to timing. Unfortunately, this also restricts user choice to those video games, and may prevent users from accessing a fuller library of software entertainment.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the claimed subject matter are directed to methods and systems that allow the delivery of a more consistent quality of service, latency-wise, for cloud rendering by moderating rendered frame rates using frame rate capping to optimize for network latency savings (or surplus). In further embodiments, the encoding/sent frame rate to the client can also be managed in addition, or as an alternative to capping the rendered frame rates. The claimed embodiments not only maintain a constant Quality of Service (QoS) for the user, but may also be employed to leverage well-performing networks to reduce operational costs.

According to an aspect of the invention, a cloud gaming system is provided that implements a method for moderating rendered frame rates to optimize for network latency. In an embodiment, the latency of a network is monitored, and based on the monitored latency, the frame rate of the image renderer is either increased to compensate for relatively poor network latency, or decreased to leverage a high performing network and to reduce the level of power consumption while maintaining a constant latency experience for the user. Monitoring of the network latency can be performed in real time, and the modifications to the rendering frame rate may be performed dynamically as network and/or game conditions change.

Since a substantial portion of latency for cloud rendering can be attributable to the network infrastructure between a user and the cloud gaming datacenter (which has a potentially high degree of variability due to distance from the cloud data center), increasing rendered frame rates to compensate for poor network conditions can be utilized to deliver a more consistent quality of service. Likewise, for users with higher performing network connections, the rendering frame rate can be relaxed (decreased) to the minimum or near minimum frame rate that still ensures a constant displayed frame rate.

Typically, video games are displayed at a constant and pre-determined frame rate. Traditionally, this rate corresponds to the number of displayed frames-per-second (often abbreviated as "fps") on the user's client device, and is commonly set to 30, 60, or 75 frames per second, though frame rates at 100 to 200 fps or higher are not unknown. When network conditions are favorable—that is, when latency attributable to the network is relatively low—the images may be processed and rendered at the server at a rate below the server's capability, or even the default rendering rate, so long as the images, after encoding and streaming through the network, may be displayed continuously at the pre-determined frame rate. When rendering at a lower frame rate, the server requires less power to operate, and therefore, over time, can experience significant savings to operational costs.

BRIEF DESCRIPTION OF THE DRAWINGS

The accompanying drawings, which are incorporated in and form a part of this specification, illustrate embodiments of the invention and, together with the description, serve to explain features of the disclosure.

DETAILED DESCRIPTION

Figure 1:
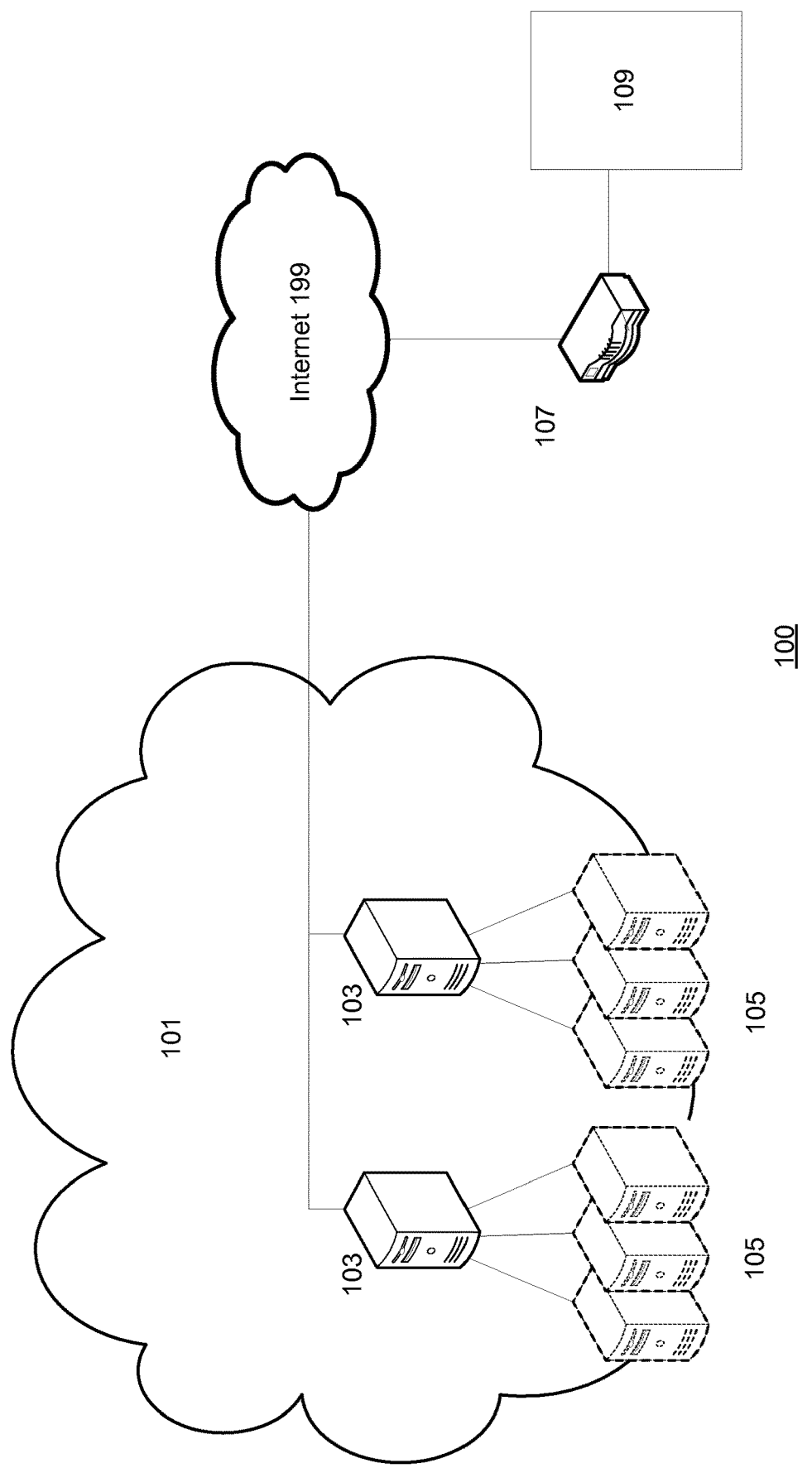
FIG. 1 is a block diagram of a cloud gaming access model, in accordance with various embodiments of the claimed subject matter.

Reference will now be made in detail to embodiments of the claimed subject matter for managing applications to avoid low and/or compromised bandwidth in a cloud data center, examples of which are illustrated in the accompanying drawings. While the claimed subject matter will be described in conjunction with the disclosed embodiments, it will be understood that they are not intended to be limit to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Cloud Access Model

FIG. 1 is an illustration of an exemplary cloud access model 100, in accordance with various embodiments of the present invention. As presented in FIG. 1, cloud access model 100 may include a cloud data center 101 with a plurality of servers 103, and communicatively coupled to a client device 109 via the Internet 199. According to various embodiments, one or more servers 103 may comprise a plurality of instantiated virtual servers 105. The servers 103 may be configured to comprise multiple logical partitions corresponding to the virtual servers, and which one or more software applications (e.g., games) may be hosted on and executed from. Users may access the games by connecting to the virtual servers (e.g., through the Internet 199), even though the actual processing and rendering of the graphical output may be performed on the physical server itself.

The client device 109 may comprise a variety of consumer and personal electronic devices. Examples of the client device 109 include, but are not limited to: personal desktop or laptop computers, mobile cellular handsets (e.g., smartphones), tablet computer devices, set top boxes, (portable) video game console devices, or any other device capable of displaying pre-rendered graphical content and receiving user input. The client device 109 may belong to a local area network (LAN), and connected to one or more gateways of the Internet 199 through a router and/or modem 107. According to some embodiments, the client device 109 may include, and/or be communicatively coupled with a display device, such as a screen or communicatively coupled monitor.

In an embodiment, a user of the client device 109 may access a cloud gaming software application by executing a portion of software on the client device 109 that creates a network connection with a corresponding server 103 in the cloud data center 101. In some instances, a graphical user interface may be generated and displayed, which prompts the user to log in to the game operator's servers (e.g., through an authentication process). Once authenticated, a play session may be initiated, and graphical content may be continuously transmitted during the play session through the network connection between the client device 109 and a server 103 in the cloud date center 101. The graphical content may comprise one or more series of images that are processed and rendered in one or more graphics processing units (GPUs) comprised in the server 103 at one or more variable rendering frame rates. Once rendered, the images may be compressed into an encoded video, buffered, and then streamed as a plurality of data packets. According to further embodiments, the rate at which the data packets are streamed (i.e., the streaming frame rate) from the buffer may also be monitored and variably managed.

Once the encoded data is received in the client device 109, the data is decoded (decompressed) and displayed to the user (e.g., in the display device) at a displayed frame rate. The displayed frame rate may be expressed as a measure of the frames per second ("fps") displayed (e.g., 30, 60, 90). User input received in the client device 109—through a graphical user interface, or other hardware input devices such as a mouse, keyboard, or controller—is transmitted directly to the server 103, and the next series of images in a sequence or a new series of images responsive to user input may be processed, rendered, encoded, and streamed back to the client device 109.

According to an aspect of the present invention, the latency experienced by the user, that is, the length of time between which the user input is received in the client device 109 and the display of the next series of images in the display device is constantly monitored. Latency may be influenced by a variety of factors including the rendering frame rate and/or the streaming frame rate at the server, the efficiency of the network infrastructure between the cloud data center 101 and the client device 109, and the distance in the network (either the physical distance, or the "logical" distance) between the cloud data center 101 and the client device 109. Higher latencies may manifest as a delay (e.g., "lag") between user action and graphical response, and is generally undesirable. According to various embodiments, one or both of the rendering frame rate and the streaming frame rate may be dynamically increased when latency is detected above a certain threshold.

By increasing the rendering and/or streaming frame rate (s), the length of time to produce and render each frame within the server decreases, lowering the contribution by the server to the overall latency. A reduction of a few milliseconds per frame rendered compensates for an equivalent length of time elsewhere in the transmission loop. For example, rendering at 30 fps (corresponding to the display frame rate at the client device 109, for example) produces a frame roughly once every 33 milliseconds. Increasing the rendering rate to 60 fps while maintaining the same display frame rate reduces the production time of a frame to roughly once every 16 milliseconds. The "extra" 16 to 17 milliseconds per frame can be used to compensate for delays in the network infrastructure, network distance, or decoding at the client device 109.

Likewise, when network attributed latency is not an issue, due to proximity to the data center and/or high performing infrastructures, encoded video data that is received and decoded at a rate higher than the display rate may be buffered at the client device. To avoid allowing the buffer to become excessively full, the rendering frame rate may be throttled, that is, decreased, as the extra production is no longer necessary to compensate for network latency. By decreasing the rendering frame rate, the components responsible for processing and rendering the frames (e.g., the graphics processing units) may be placed in a lower power state, and thereby consume power at a lower rate. Typically, a large portion of the cost for a cloud gaming operator is the cost of operating the data center, and the largest single factor incurred by operating a data center is the required power usage. Thus, leveraging high-performing network connections to increase the efficiency of the consumption of power can result in substantial savings to cloud gaming operators.

Cloud Access Model

Figure 2:
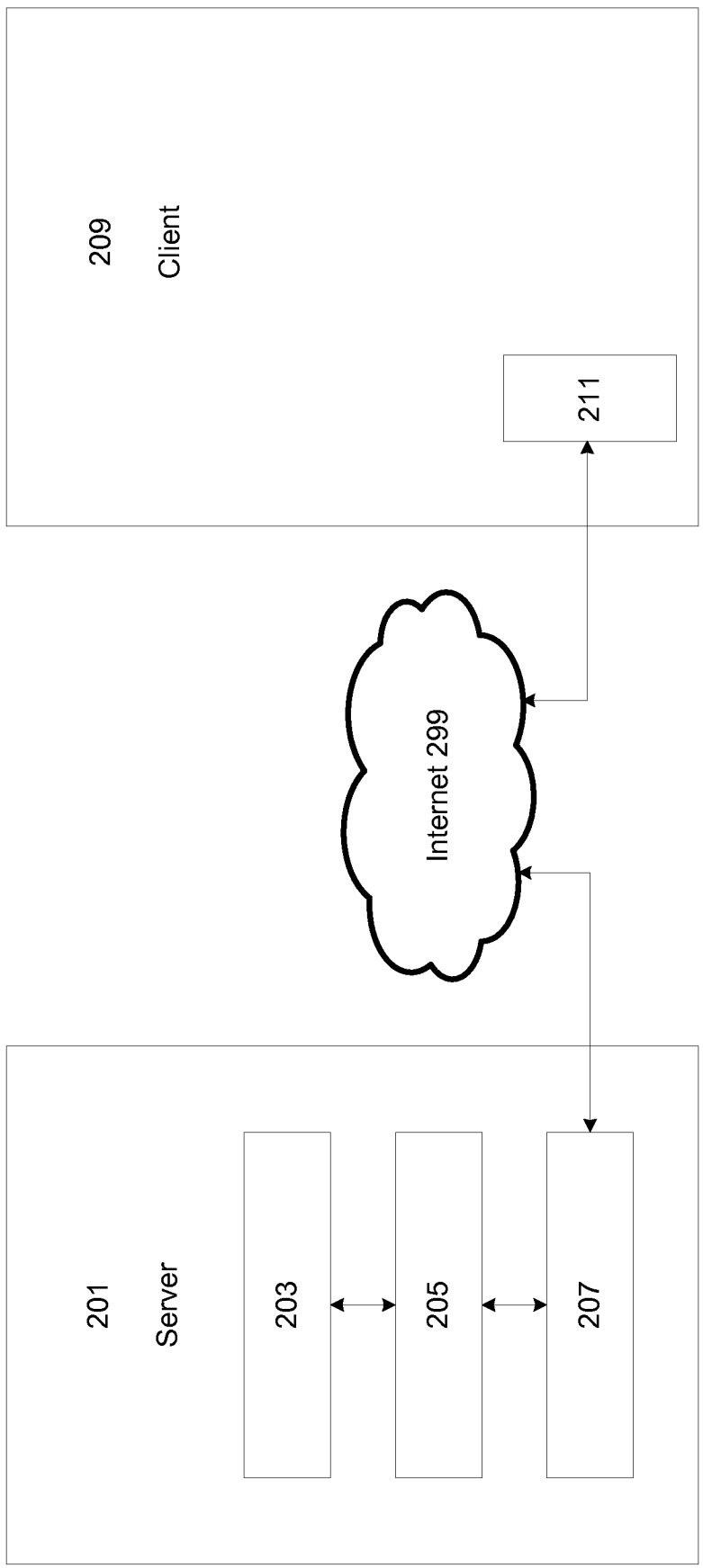
FIG. 2 is a block diagram of a cloud gaming server architecture, in accordance with conventional practice.

FIG. 2 is an illustration of an exemplary cloud gaming server architecture 200, in accordance with various embodiments of the present invention. As presented in FIG. 2, cloud gaming server architecture 200 may include a cloud gaming server 201 communicatively coupled to a client device 209 via the Internet 299. As depicted in FIG. 2, the cloud gaming server 201 includes an image rendering component 203 (e.g., one or more graphics processing unit(s)), operable to receive and process programmed instructions from a memory (not shown) and to render graphical images according to the instructions. Cloud gaming server 201 is also depicted to include a server control module 205, coupled to rendering component 203, and configured to monitor the latency of data streamed over network connections with client devices 209 and to dynamically adjust the rate at which images are rendered by the rendering component 203 based on the monitored latency.

In an embodiment, during a gaming session, a network connection is established through the Internet 299 between a client control module 211 in the client device 209 and a stream component 207 in the server 201. Frames which are rendered in rendering component 203 may be received in server control module 205 and passed to stream component 207. The stream component 207 can encode and compress the received image data into encoded video, which the stream component 207 then transmits as a plurality of packets over time to the client control module 211 in the client device 209. User input (e.g., controller input) received in the client device 209 is then forwarded back to the server 201 and recorded, before programmed instructions corresponding to the user input are referenced and a new or next sequence of images are processed and rendered. The latency of the gaming session (including the latency attributable to the network and the latency attributable to producing the encoded video streams) corresponds to the length of time between the reception of user input in the client device 209 and the display of the new or next sequence of images in the client device 209 responsive to the user input. According to various embodiments, the latency may be monitored by the server control module 205, or the client control module 211, which then notifies the server control module 205 of the detected latency.

When latency is high—such as above a pre-determined threshold—the server control module 205 can dynamically adjust the power state of the rendering component 203 up, and increase the rendering frame rate of the rendering component 203 to reduce the latency contribution of the game server. Likewise, the stream component 205 can also increase the stream rate separately, or in addition to increasing the rendering frame rate of the rendering component 203. When latency is low—below a second pre-determined threshold for example—the server control module 205 can adjust the power state of the rendering component 203 down, effectively capping the rendering frame rate of the rendering component 203 to increase the latency contribution of the game server but reduce the rate power is consumed by the rendering component 203. Based on bandwidth and latency between the client and server, the game's images may be rendered at a rate N fps in the rendering component 203, and streamed at rate X from the stream component 207. According to some embodiments, monitoring of the latency may be performed in real time and one or both of the frame rate and encoding/decode rate may be adjusted dynamically. According to still further embodiments, data transmissions between the server 201 and the client device 209 performed during an active game session may be performed according to the Real-time Transport Protocol (RTP). Under RTP, latency and packet loss (due to a drop in bandwidth) are constantly measured. This data is communicated to the stream component 207, and relayed to the server control module 205, which will then modify the rendering framerate of the game accordingly. In still further embodiments, a default profile/heuristic that includes values for the render, stream, and/or display frame rates may be created and stored per game.

Dynamically Adjusting Rendering Frame Rates in Cloud Gaming Server

Figure 3:
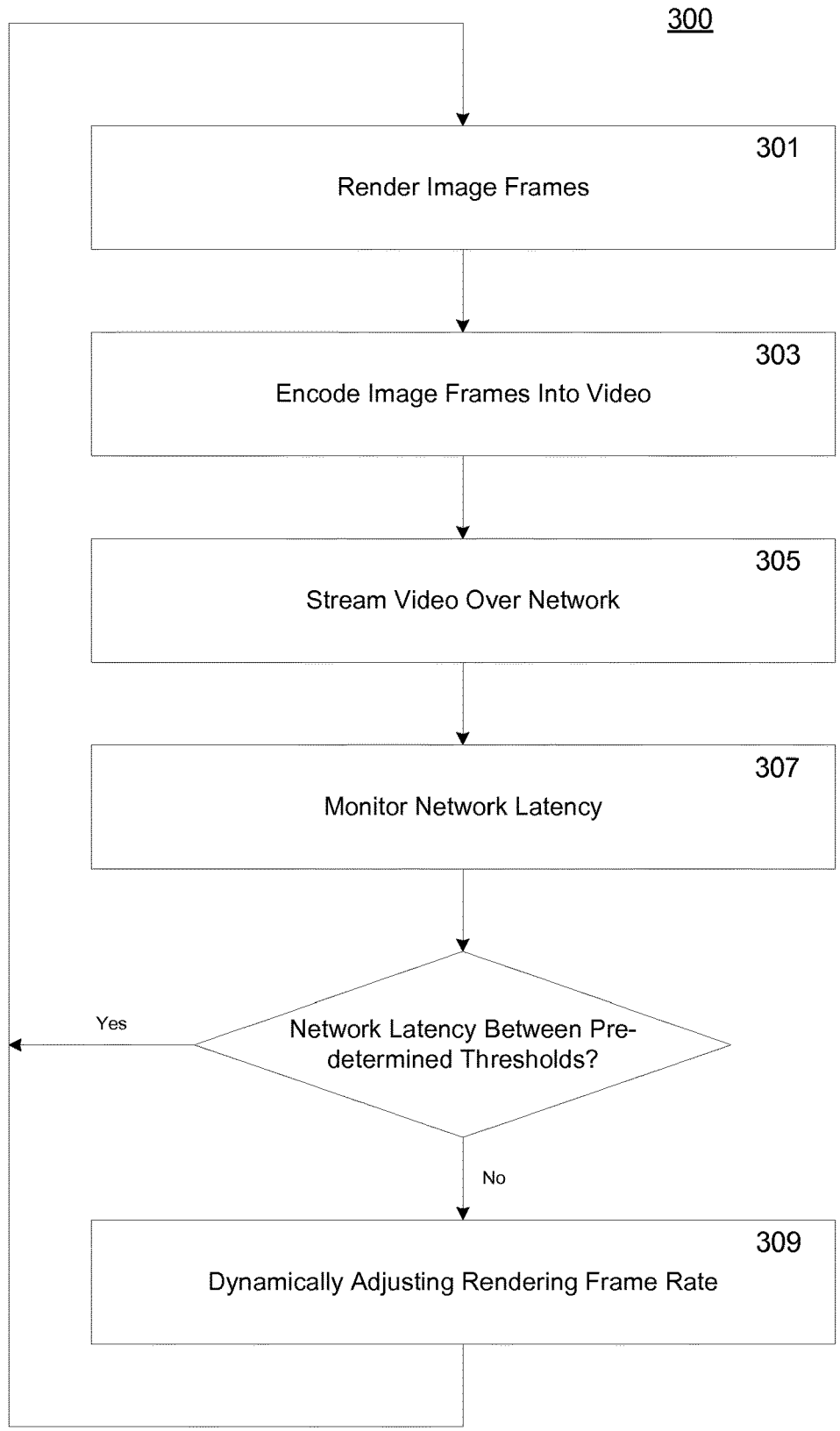
FIG. 3 is an illustration of a flowchart for dynamically adjusting rendering frame rates in a cloud gaming server, in accordance with various embodiments of the claimed subject matter.

FIG. 3 is an illustration of a flowchart 300 for dynamically adjusting rendering frame rates in a cloud gaming server, in accordance with an embodiment. Specifically, the method describes the steps performed to dynamically adjust the production rate of graphical images in response to detected latency conditions. Steps 301-309 describe the steps comprising the process depicted in the flowchart 300 of FIG. 3. In one embodiment, the flowchart 300 is performed by a server in a cloud data center.

At step 301, a sequence of graphical images are processed and rendered as frames. The graphical images may be rendered by a dedicated graphics processor, such as a graphics processing unit, in a server of a cloud data center, for example. In an embodiment, the graphical images may be rendered at a pre-determined rendering frame rate, and according to programmed instructions in a local memory. In still further embodiments, the graphical images may be rendered at the highest rendering frame rate possible for the graphics processor, and/or correspond to the current power state of the graphics processor. Once rendered, the sequence of frames is encoded into a video of a compressed format at step 303, and streamed as video over a network connection. In an embodiment, the video is streamed at 305 at a second pre-determined frame rate, e.g., the streaming frame rate, and may be streamed over a variety of Internet protocols corresponding to various embodiments. These protocols may include, for example, Real-time Protocol (RTP), Real-time Streaming Protocol (RTSP), session initiation protocol (SIP), Hyper-Text Transport Protocol (HTTP), among others. Streaming may be performed during a gaming session initiated with one or more of these protocols, and received in a client device communicatively coupled to the server through a network, such as the Internet.

At step 307, the latency of data transmissions during the gaming session is continuously monitored. Monitoring may be performed continuously at periodic intervals, to accompany events (e.g., successful or unsuccessful transmissions), and/or responsive to frequent trigger events. When the monitored latency is determined to be within normal boundaries, that is, not exceeding one or more pre-determined thresholds, steps 301-307 are repeated for the duration of the gaming session. When the monitored latency is determined to exceed a predetermined threshold, that is, if the latency is above a first threshold that represents the upper bound of an acceptable amount of latency, the pre-determined rendering frame rate is dynamically adjusted, such that the next sequence of images is rendered at a higher frame rate. As discussed above, increasing the rendering and/or streaming frame rate(s) reduces the length of time required to produce and render each frame in server, thereby lowering the server's contribution to the overall latency. On the other hand, if the latency is below another threshold that indicates the presence of a surplus in processing speed, the rendering frame rate can be dynamically adjusted for the next sequence of images, such that the frames are produced at a slower rate, and increasing the server's contribution to the overall latency. Under such conditions, the rendering frame rate may be prevented from dropping below a minimum frame rate required to maintain a constant Quality of Service to the user (e.g., a minimum 30 fps displayed). In further embodiments, the rendering frame rate may be decreased to the lowest frame rate that still provides a consistent QoS. In further embodiments, the power state of the graphics processor performing the rendering and/or the server itself, may be adjusted (decreased) to correspond to the adjusted rendering frame rate.

Once adjusted (either increased or decreased), the next sequence of frames are rendered with the adjusted frame rate, and steps 301 through 307 are repeated. In further embodiments, the display of the rendered frames may be accompanied by user input corresponding to user control. According to such embodiments, the next sequence of frames may be rendered responsive to the user input and at the adjusted rendering frame rate. In still further embodiments, the rate of streaming of the encoded video performed in step 305 may also be adjusted at step 309 for the same purposes as adjusting the rendering frame rate.

Displaying Graphical Output with Dynamically Adjusted Rendering Frame Rates

Figure 4:
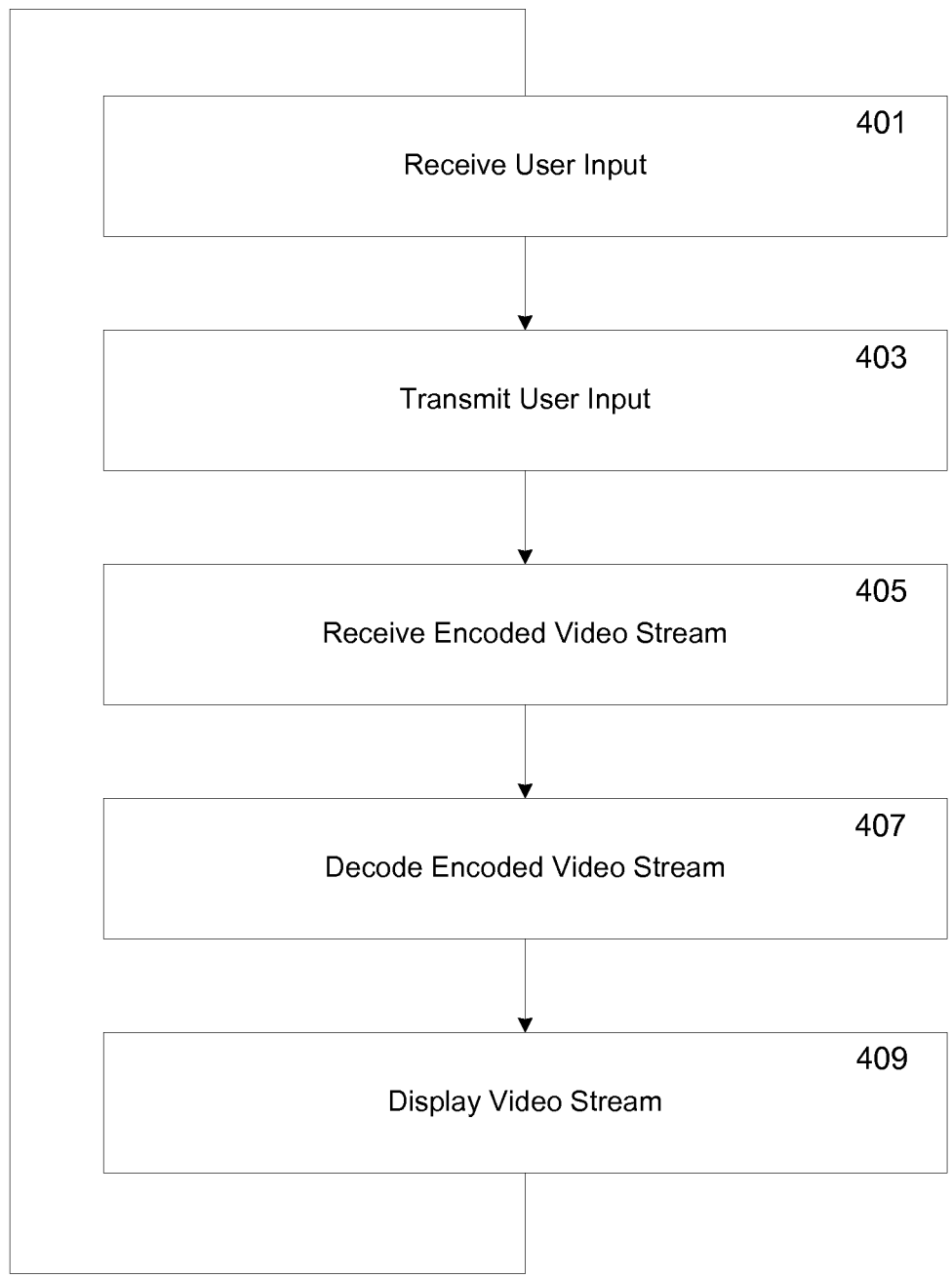
FIG. 4 is an illustration of a flowchart for displaying graphical output with dynamically adjusted rendering frame rates, in accordance with various embodiments of the claimed subject matter.

FIG. 4 is an illustration of a flowchart 400 for displaying graphical output with dynamically adjusted rendering frame rates, in accordance with an embodiment. Specifically, the method describes the steps performed in a client device to display images rendered with dynamically adjusted rendering frame rates. Steps 401-409 describe the steps comprising the process depicted in the flowchart 400 of FIG. 4. In one embodiment, the flowchart 400 is performed in a client device with physically incorporated display screens and (wireless) networking capability, which may include (but are not limited to): mobile smartphones, laptop or tablet computers, personal digital assistants, handheld video game consoles. In still further embodiments, the flowchart 400 is performed in a client device with a communicatively coupled display device. Under these embodiments, the client device may include (but are not limited to): personal computers, set top boxes, media players, and video game consoles, with communicatively coupled monitors, televisions, projection screens, or other devices capable of displaying graphical output.

At step 401, user input is received in a client device. User input may be received in a user input device, including (but not limited to): a controller, mouse, or keyboard; or through physical input devices such as buttons, analog control pads, or triggers, for example. The user input may be responsive to graphical output rendered by a server in a remotely located cloud data center and transmitted over a network connection, for example. In an embodiment, reception of the user input in the client device may be tracked, e.g., as a signal to initiate (or resume) monitoring of the network latency. At step 403, the user input is transmitted to a connected game server. Transmission may be accomplished over a network connection and according to one or more data transmission protocols. According to some embodiments, when the user input is received in the game server, a sequence of images may be rendered that is responsive to the input received. The sequence of images may be then encoded as a video and streamed over the network connection, where it is received by the client device at step 405. The encoded data is subsequently decoded at step 407, and finally displayed in the display device at step 409. Once the received data is decoded and displayed, the length of time since the user input was received may be measured and communicated to the game server as the determined latency.

The game server may determine, based on the communicated latency, what portion of the latency is attributable to the network connection, and may adjust various internal production or communication rates accordingly, as previously described herein.

Example Computing Device

Figure 5:
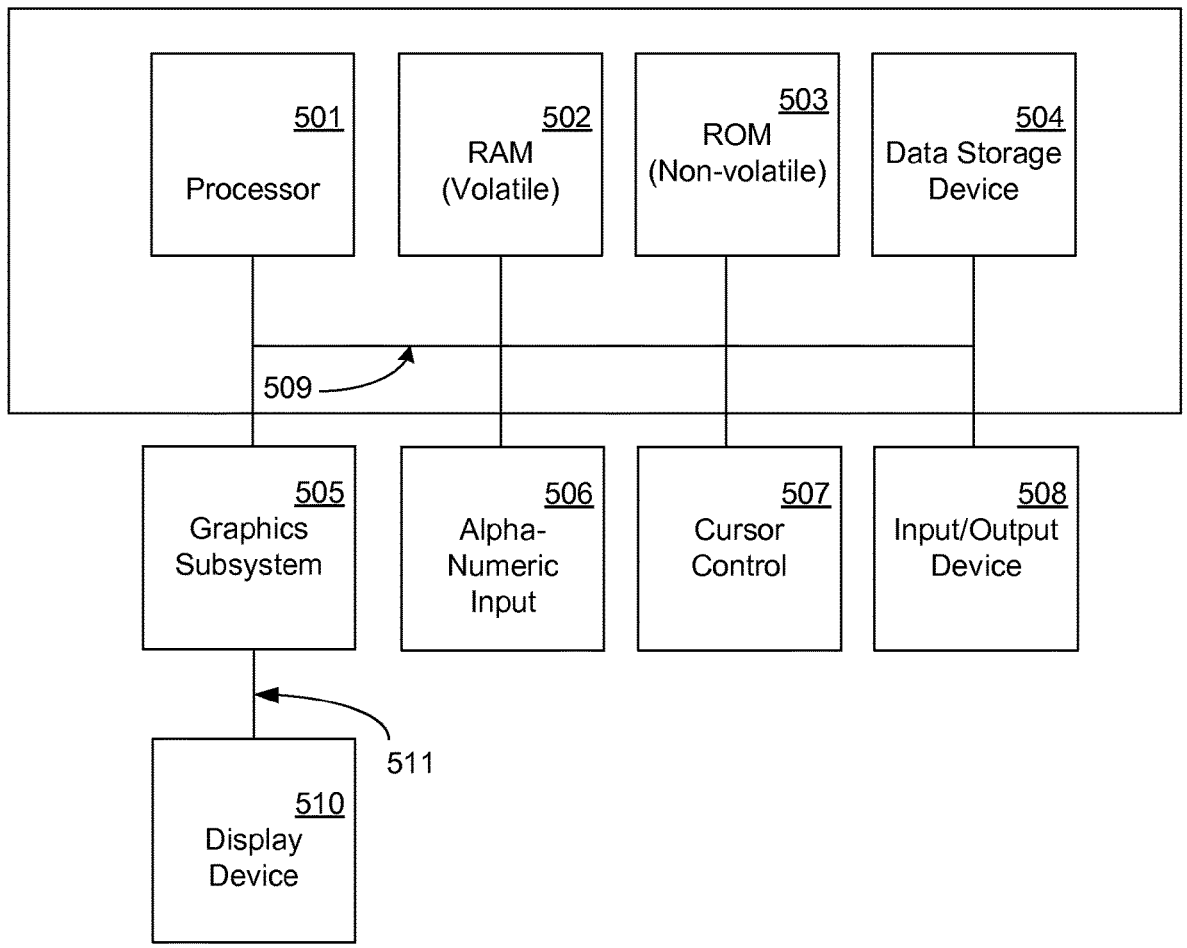
FIG. 5 is a block diagram of an exemplary computing system in accordance with various embodiments of the claimed subject matter.

As presented in FIG. 5, a system upon which embodiments of the present invention may be implemented includes a general purpose computing system environment, such as computing system 500. In an embodiment, a game server, such as the server 103 and 201 described above with respect to FIGS. 1 and 2 may be implemented as computing system 500. In alternate embodiments, a client device, such as client device 109 or 209 likewise described above with respect to FIGS. 1 and 2 may be implemented instead of, or in addition to the game server as computing system 500. In its most basic configuration, computing system 500 typically includes at least one processing unit 501 and memory, and an address/data bus 509 (or other interface) for communicating information. Depending on the exact configuration and type of computing system environment, memory may be volatile (such as RAM 502), nonvolatile (such as ROM 503, flash memory, etc.) or some combination of the two.

Computer system 500 may also comprise an optional graphics subsystem 505 for presenting information to the computer user, e.g., by displaying information on an attached display device 510, connected by a video cable 511. According to embodiments of the present claimed invention, the display device may be physically mounted on the computing system 500 and coupled to the graphics subsystem 505. Alternatively, the graphics subsystem 505 may be coupled directly to the display device 510 through the video cable 511, or indirectly via wireless means. Computing system 500 implemented as a game server may process and render graphical images in graphics subsystem 505 according to programmed instructions stored in memory (502, 503) and processed in processing unit 501. The graphical output produced by a game server may be received in a client device implemented as a second computer system 500, decoded in the processing unit 501 of the second computer system 500 and displayed to the user in the display device 510.

Additionally, computing system 500 may also have additional features/functionality. For example, computing system 500 may also include additional storage (removable and/or non-removable) including, but not limited to, magnetic or optical disks or tape. Such additional storage is illustrated in FIG. 5 by data storage device 507. Computer storage media includes volatile and nonvolatile, removable and non-removable media implemented in any method or technology for storage of information such as computer readable instructions, data structures, program modules or other data. RAM 502, ROM 503, and data storage device 504 are all examples of computer storage media.

Computer system 500 also comprises an optional alphanumeric input device 506, an optional cursor control or directing device 507, and one or more signal communication interfaces (input/output devices, e.g., a network interface card) 509. Optional alphanumeric input device 506 can communicate information and command selections to central processor 501. Optional cursor control or directing device 507 is coupled to bus 509 for communicating user input information and command selections to central processor 501. Signal communication interface (input/output device) 509, also coupled to bus 509, can be a serial port. Communication interface 509 may also include wireless communication mechanisms. Using communication interface 509, computer system 500 can be communicatively coupled to other computer systems over a communication network such as, for example, the Internet or an intranet (e.g., a local area network), or can receive data (e.g., a digital television signal).

As described herein, embodiments of the claimed subject matter have been provided which allow the delivery of a consistent quality of service, latency-wise, for cloud gaming services by monitoring and moderating rendered frame rates using dynamic frame rate adjustment to optimize for network latency savings (or surplus). According to various embodiments the encoding/streaming frame rate to the client can also be managed along with, or as an alternative to, managing the rendered frame rates. The claimed embodiments not only maintain a constant Quality of Service (QoS) for the user, but may also be employed to leverage well-performing networks to reduce operational costs. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A processor comprising:
    processing circuitry to:
        receive, at a first time during a content streaming session between a client device and a remote device, first data representative of one or more first image frames rendered at a first rendering frame rate using the remote device; and
        receive, at a second time during the content streaming session, second data representative of one or more second image frames rendered at a second rendering frame rate using the remote device,
        wherein:
            the second rendering frame rate is greater than the first rendering frame rate when a second network latency corresponding to the second time is determined to be above a first network latency corresponding to the first time; and the second rendering frame rate is less than the first rendering frame rate when the second network latency corresponding to the second time is determined to be above the first network latency corresponding to the first time.

2. The processor of claim 1, wherein the processing circuitry is further to:
receive input data representative of one or more inputs to one or more input devices during the content streaming session; and
send the input data to the remote device,
wherein at least one of the first data or the second data is rendered based at least on the input data.

3. The processor of claim 1, wherein the first network latency and the second network latency are determined using one or more of the client device or the remote device.

4. The processor of claim 1, wherein, during the content streaming session, the first data and the second data are streamed to the client device at a substantially same streaming frame rate.

5. The processor of claim 1, wherein the processing circuitry is further to cause display of the one or more first image frames and the one or more second image frames on a display of the client device, wherein the one or more first image frames and the one or more second image frames are displayed at a substantially consistent display frame rate.

6. The processor of claim 1, wherein network latency is monitored during the content streaming session, and an adjustment from the first rendering frame rate to the second rendering frame rate occurs dynamically.

7. The processor of claim 1, wherein the processing circuitry is further to decode the first data to generate first display data for display using the client device and to decode the second data to generate second display data for display using the client device.

8. The processor of claim 1, wherein the processor is comprised in a cloud gaming system, and the content streaming session is initialized using a cloud gaming application.

9. The processor of claim 1, wherein an adjustment from the first rendering frame rate to the second rendering frame rate is based at least on comparing the first network latency to one or more network latency thresholds.

10. The processor of claim 1, wherein the processor is comprised in at least one of a laptop computer, a desktop computer, a tablet computer, a smartphone, a personal digital assistant, a set top box, a media player, or a game console.

11. A system comprising:
one or more processing units to execute operations comprising:
receiving, at a first time during a content streaming session, first data representative of one or more first frames rendered using a remote device at a first rendering frame rate; and
receiving, at a second time during the content streaming session, second data representative of one or more second frames rendered using the remote device at a second rendering frame rate different from the first rendering frame rate,
wherein the second rendering frame rate is greater than the first rendering frame rate when a computed latency value is above a first threshold value and the second rendering frame rate is less than the first rendering frame rate when the computed latency value is below a second threshold value.

12. The system of claim 11, wherein the computed latency value corresponds to an amount of time between inputs to a client device-being visually reflected in at least one of the one or more first frames or the one or more second frames.

13. The system of claim 11, wherein the system is comprised in a cloud gaming environment, and the content streaming session corresponds to an instance of a game.

14. The system of claim 11, wherein at least one of the first rendering frame rate or the second rendering frame rate are selected based at least on a quality of service (QoS) parameter.

15. A method comprising:
initializing a content streaming session between a client device and a remote device;
receiving, at a first time during the content streaming session, first data representative of one or more first image frames rendered using the remote device at a first rendering frame rate; and
receiving, at a second time during the content streaming session, second data representative of one or more second image frames rendered using the remote device at a second rendering frame rate different from the first rendering frame rate,
wherein:
the second rendering frame rate is greater than the first rendering frame rate when a second network latency corresponding to the second time is determined to be above a first network latency corresponding to the first time; and
the second rendering frame rate is less than the first rendering frame rate when the second network latency corresponding to the second time is determined to be above the first network latency corresponding to the first time.

16. The method of claim 15, wherein network latency is monitored during the content streaming session, and an adjustment from the first rendering frame rate to the second rendering frame rate occurs dynamically.

17. The method of claim 15, further comprising decoding the first data to generate first display data for display using the client device and to decode the second data to generate second display data for display using the client device.

18. The method of claim 15, wherein the client device and the remote device are comprised in a cloud gaming system, and the initializing the content streaming session is using a cloud gaming application.

19. The method of claim 15, wherein an adjustment from the first rendering frame rate to the second rendering frame rate is based at least on comparing the first network latency to one or more network latency thresholds.

* * * * *